United States Patent [19]

Ishida et al.

[11] Patent Number: 4,933,695

[45] Date of Patent: Jun. 12, 1990

[54] METHOD OF DRIVING A MOTOR-DRIVEN SHUTTER FOR A CAMERA

[75] Inventors: Hiroaki Ishida; Shigeru Tagami; Yoshio Umezu; Masaki Tanaka, all of Chiba, Japan

[73] Assignee: Seikosha Co., Ltd., Tokyo, Japan

[21] Appl. No.: 369,793

[22] Filed: Jun. 22, 1989

[30] Foreign Application Priority Data

Jun. 24, 1988 [JP] Japan .................. 63-156379

[51] Int. Cl.$^5$ .............................................. G03B 7/08
[52] U.S. Cl. .................................................. 354/234.1
[58] Field of Search ...................................... 354/234.1

[56] References Cited

U.S. PATENT DOCUMENTS 4,779,114 10/1988 Kobayashi ................ 354/234.1 X
4,868,596 9/1989 Ishida et al. ............... 354/234.1 X

*Primary Examiner*—Michael L. Gellner
*Attorney, Agent, or Firm*—Jordan and Hamburg

[57] ABSTRACT

A method of driving a motor-driven shutter for a camera having a sector opening lever which is pivotal to open and close sectors, a sector opening cam movably supported and engageable with an engagement pin provided on the sector opening lever, an actuating member for pivoting the sector opening lever through engagement between the sector opening cam and the engagement pin, and a reversible motor for driving the actuating member. The motor is temporarily suspended when the actuating member is driven to a position where the sector opening cam comes into contact with the engagement pin, and the motor is restarted to cause the engagement pin to reach a predetermined position on the sector opening cam. Thus, it is possible to obtain a stable shutter opening operation and hence increase the degree of aperture accuracy.

15 Claims, 3 Drawing Sheets

METHOD OF DRIVING A MOTOR-DRIVEN SHUTTER FOR A CAMERA

BACKGROUND OF THE INVENTION

1. Field of the Invention

The present invention relates to a method of driving a motor-driven shutter for a camera.

2. Description of the Related Art

In a typical conventional method of driving a motor-driven shutter for a camera, a travelling member is rotated in one direction by activating a motor so that, during the rotational movement of the travelling member, a sector opening cam provided on the travelling member engages an engagement pin provided on a sector opening lever. As the travelling member continues to rotate, the engagement pin rides on the sector opening cam, causing the sector opening lever to pivot, and thus opening the shutter. After the engagement pin has reached a predetermined position on the sector opening cam, the motor is reversed to cause the travelling member to rotate in the opposite direction and return to the previous position.

The above-described conventional method suffers, however, from the following problems. Namely, in the prior art method, immediately after coming into contact with the sector opening cam, the engagement pin rides on the cam, thus suddenly opening the shutter which has been closed. Since the static friction, that is, the force required to move the shutter when closed, is considerably large, a great deal of inertia acts on the shutter when opened suddenly. In addition, the load is increased by the engagement pin riding on the cam. For this reason, the shutter undulates and this makes it impossible to obtain an adequate degree of aperture accuracy and leads to variations in the degree of opening of the aperture.

To solve this problem, it is conventional practice to reduce the change in the slope of the cam so that the shutter is gently operated during the initial stage of the shutter opening operation. This conventional practice, however, has the problem that the operating stroke of the cam increases.

SUMMARY OF THE INVENTION

In view of the above-described circumstances, it is a primary object of the present invention to provide a method of driving a motor-driven shutter for a camera which enables the shutter to be activated gently in the initial stage of the shutter opening operation, thereby minimizing the effect of inertia, and thus stabilizing the aperture accuracy.

To this end, the present invention provides a method of driving a motor-driven shutter for a camera having a sector opening lever which is pivotal to open and close sectors, a sector opening cam movably supported and engageable with an engagement pin provided on the sector opening lever, an actuating member for pivoting the sector opening lever through engagement between the sector opening cam and the engagement pin, and a reversible motor for driving the actuating member, the method comprising the steps of: temporarily suspending the motor when the actuating member is driven to a position where the sector opening cam comes into contact with the engagement pin; and restarting the motor to cause the engagement pin to reach a predetermined position on the sector opening cam.

According to the method of the present invention wherein the motor is temporarily suspended when the actuating member is driven to a position where the sector opening cam comes into contact with the engagement pin and the motor is restarted thereafter, the inertia acting on the actuating member moved preparatorily (as an approach run) to open the shutter is eliminated and then the motor is restarted to open the shutter. Thus, it is possible to obtain a stable shutter opening operation and hence increase the degree of aperture accuracy.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and, of which.

DESCRIPTION OF THE PREFERRED EMBODIMENT

One embodiment of the present invention will be described below in detail with reference to the accompanying drawings.

Figure 1:
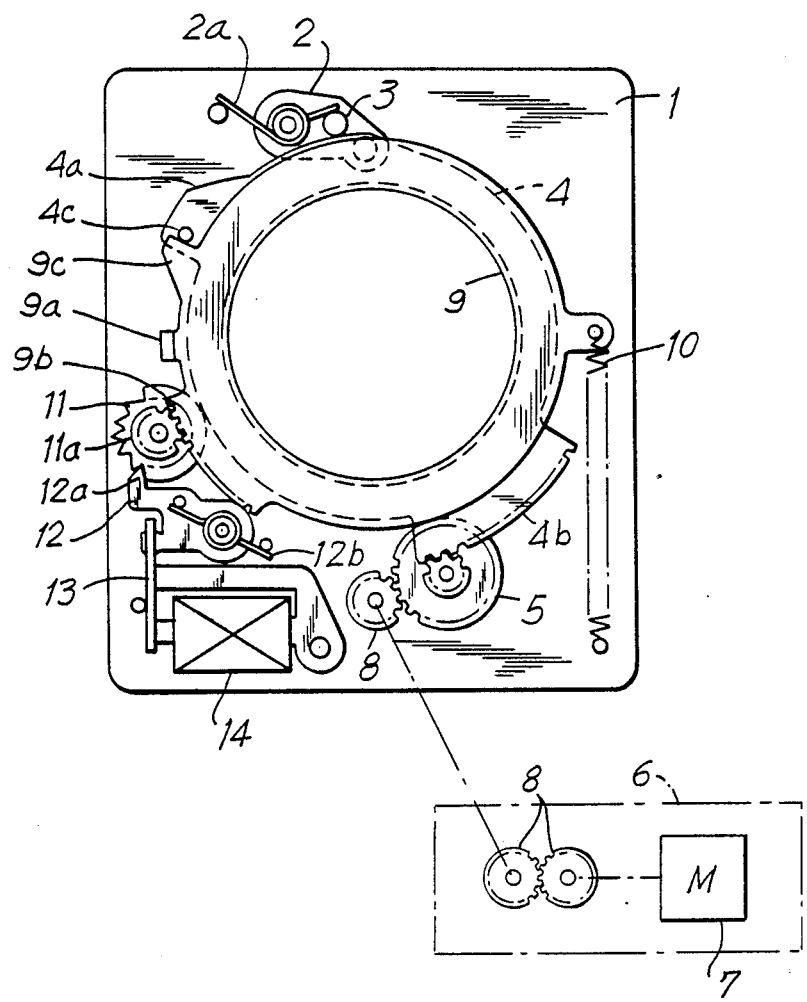
FIG. 1 shows the arrangement of a motor-driven shutter for a camera to which one embodiment of the method according to the present invention is applied.

Referring first to FIG. 1, a sector opening lever 2 for opening and closing sectors (not shown) is pivotally supported on a base 1 constituting a shutter unit. The sector opening lever 2 is provided with an engagement pin 3 which is urged by a spring 2a so as to contact an actuating member 4 (described later). The actuating member 4 is a ring-shaped member which is provided on the base 1 so as to be rotatable back and forth. The actuating member 4 has a sector opening cam 4a and a sector gear 4b which are projectingly formed on the outer peripheral portion thereof. An idler 5 meshes with the sector gear 4b. The actuating member 4 rotates clockwise and counterclockwise through the idler 5 in response to the rotation of a reversible motor 7 incorporated in a camera body 6, the motor 7 being rotated forward and backward in accordance with a program set previously. The reference numeral 8 denotes a mechanism for transmitting the rotation of the reversible motor 7 to the idler 5.

A distance range ring 9 is provided on the base 1 in such a manner as to be rotatable and concentrical with respect to the actuating member 4. The distance range ring 9 drives a photographing lens (not shown) through a lens drive portion 9a so that the lens is focused. A sector gear 9b is projectingly formed on the outer peripheral portion of the distance range ring 9 for holding the photographing lens in an in-focus position. The distance range ring 9 is biased so as to rotate clockwise by the action of a spring 10. A pinion 11a which is formed integral with a ratchet wheel 11 meshes with the sector gear 9b. To regulate the rotation of the ratchet wheel 11, a locking lever 12 having a locking pawl 12a engaged with the ratchet wheel 11 is rotatably supported on the base 1, the lever 12 being biased so as to rotate clockwise by the action of a spring 12b. The locking lever 12 has an iron piece 13 connected to the rear end portion thereof. When the iron piece 13 is attracted to an electromagnet 14, the locking lever 12 pivots counterclockwise against the resilient force from the spring 12b, so that the locking pawl 12a is held at a position disengaged from the ratchet wheel 11. When the electromagnet 14 is de-energized, the locking pawl 12a is engaged with the ratchet wheel 11 by means of the resilient force from the spring 12b. The distance range ring 9 is movable together with the forward and backward rotation of the actuating member 4 through the contact between a drive pin 4c projecting from the actuating member 4 and an inverse cam 9c provided on the distance range ring 9.

The operation of the shutter will next be explained.

First of all, a lens changeover switch (not shown) is actuated to activate a motor (not shown) so as to draw out the shutter unit from the camera body 6 or draw back the former into the latter according to whether the optical system is to be set in the telescopic mode or in the wide mode.

When, in this state, a release button (not shown) is actuated, the reversible motor 7 provided in the camera body 6 first rotates backward to drive the distance range ring 9 to rotate counterclockwise through the actuating member 4, thus causing the pinion 11a to rotate clockwise to thereby disengage the locking pawl 12a from the ratchet wheel 11. This state is held by the electromagnet 14 through the iron piece 13. Then, the motor 7 is rotated forward to activate the actuating member 4 to rotate clockwise through the sector gear 4b. In consequence, the distance range ring 9 is also rotated by means of the resilient force from the spring 10, together with the rotation of the actuating member 4. When an in-focus position is reached, the supply of power to the electromagnet 14 is cut off and the iron piece 13 is released. As a result, the locking lever 12 is pivoted by means of the resilient force from the spring 12b, causing the locking pawl 12a to engage with the ratchet wheel 11, and thus locking the photographing lens in the in-focus position.

Figure 2:
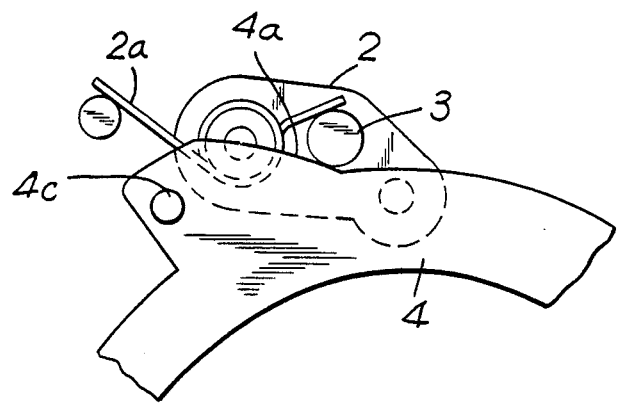
FIGS. 2 and 3 are enlarged front views of an essential part of the arrangement shown in FIG. 1, which show the operation of the essential part.
Figure 3:
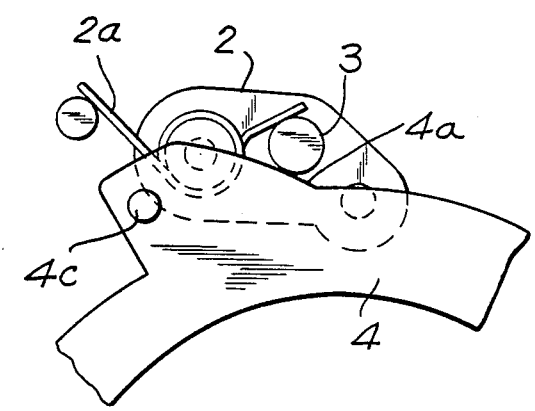

The motor 7 is further rotated forward and the actuating member 4 is therefore continued to rotate clockwise. When the sector opening cam 4a reaches a position where it comes into contact with the engagement pin 3, as shown in FIG. 2, the reversible motor 7 is temporarily suspended. At this time, the shutter has not yet been opened and is therefore in a position where the opening diameter is 0. As the motor 7 is restarted subsequently, the engagement pin 3 rides on the sector opening cam 4a, as shown in FIG. 3, causing the sector opening lever 2 to pivot counterclockwise against the spring 2a, and thus opening the shutter. When the engagement pin 3 reaches a predetermined position on the sector opening cam 4a, the motor 7 is reversed, so that the actuating member 4 rotates counterclockwise. In consequence, the engagement pin 3 comes down on the sector opening cam 4a and the sector opening lever 2 is also pivoted clockwise by means of the resilient force from the spring 2a to return to the previous position.

Although in the foregoing embodiment the actuating member 4 is a ring-shaped member which is rotatable back and forth, the present invention is not necessarily limitative to such configuration. For example, the actuating member 4 may be a member which reciprocates linearly. In other words, any member which is suitable for attaining the object of the present invention may be employed.

Figure 4:
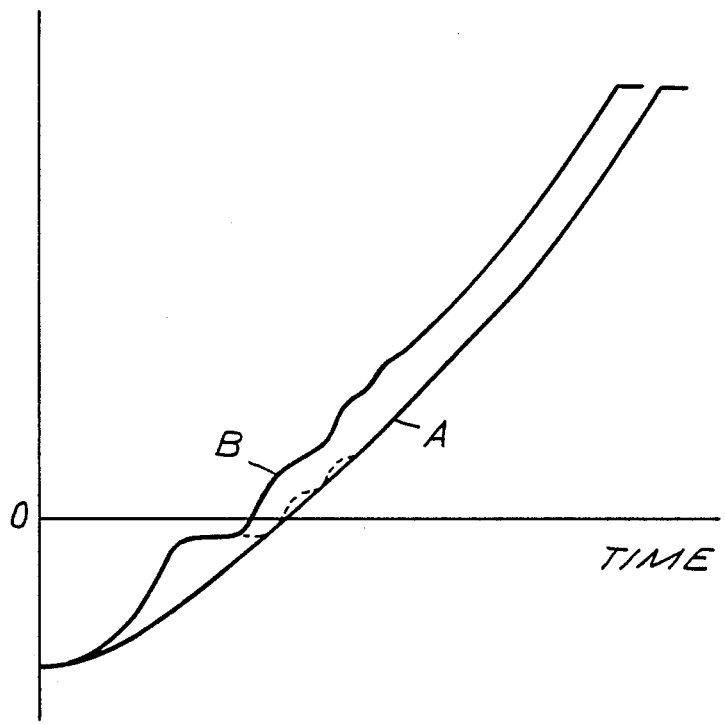
FIG. 4 is a graph showing the opening motion of the shutter.

FIG. 4 is a graph showing the sweep of the shutter when it opens, in which the axes of ordinate and abscissa represent the opening diameter and the time, respectively. As represented by the curve A, an ideal sweep is such that the shutter opens gently as the time goes by. In the case where the shutter is opened by the above-described method of driving the motor 7 according to the present invention, the shutter moves rapidly until the position for an opening diameter of 0 is reached, as shown by the sweep B. However, since the motor 7 is temporarily suspended when said position is reached, the motion of the shutter is suspended, so that the sweep approaches the sweep A. Then, the shutter is moved again by restarting the motor 7, thus reaching a predetermined opening diameter. In contrast, in the case where the motor 7 is continuously driven as in the prior art, the motion of the shutter is not temporarily suspended at the position for an opening diameter of 0 so that the sweep would approach the sweep A, but the sweep is away from the sweep A to a substantial extent. In other words, the shutter moves while undulating until a predetermined opening diameter is reached. For this reason, there have heretofore been problems such as those described above.

Thus, according to the motor driving method of the present invention, the motor is temporarily suspended when the sector opening cam reaches a position where it comes into contact with the engagement pin and the shutter has not yet been opened, i.e., the opening diameter is 0, and the motor is restarted thereafter. Accordingly, the shutter starts to move gently when it is to be opened and it is therefore possible to minimize the effect of the inertia acting on the shutter when it starts to move. Thus, the shutter opens to a predetermined opening diameter smoothly and stably, so that the aperture accuracy is improved and the fluctuation of exposure time can be eliminated.

Although the present invention has been described through specific terms, it should be noted here that the described embodiment is not necessarily exclusive and that various changes and modifications may be imparted thereto without departing from the scope of the invention which is limited solely by the appended claims.

What we claim is:

1. A method of driving a motor-driven shutter for a camera of the type having a sector opening lever which is pivotal to open and close sectors, a sector opening cam movably supported and engageable with an engagement pin provided on said sector opening lever, an actuating member for pivoting said sector opening lever through engagement between said sector opening cam and said engagement pin, and a reversible motor for driving said actuating member, the method comprising the steps of:

temporarily suspending said motor when said actuating member is driven by said motor to a position where said sector opening cam comes into contact with said engagement pin; and restarting said motor to cause said engagement pin to reach a predetermined position on said sector opening cam.

2. A method of operating a camera having a shutter openable by moving a moveable member comprising the steps of:

driving a cam operable means toward said moveable member, stopping said driving step when said cam operable means reaches said moveable member; and restarting said driving step and effecting engagement between said cam operable means and said moveable member and thereby effecting opening of said shutter, said restarting step being operable to substantially reduce the inertial engagement between said cam operable means and said moveable member.

3. A method according to claim 2, wherein said camera has a camera function adjustment means, and further comprising the step of driving said cam operable means away from said moveable member toward said camera function adjustment means for effecting adjustment of said camera function adjustment followed by said step of driving said cam operable means toward said moveable member.

4. A method according to claim 3, wherein said cam operable means comprises a rotatably mounted actuating ring member having a cam section thereon, said step of driving said cam operable means comprising utilizing a motor to rotate said ring member.

5. A method according to claim 4, wherein said camera function adjustment means comprises a rotatably mounted distance ring coaxial with said actuating ring member, said step of driving said cam operable means away from said moveable member comprising rotating said ring member in one direction and also rotating said distance ring member in said one direction, said step of driving said cam operable means toward said moveable member comprising rotating said actuating ring member in a direction opposite to said one direction.

6. A method according to claim 5, wherein said camera function adjustment means is a focus adjustment means.

7. A method according to claim 5 further comprising utilizing a reversible motor for driving said actuating ring member.

8. A method of obtaining stable shutter opening operation and enhancing aperture accuracy of a camera comprising:

driving a cam operable means toward a moveable member which is moveable to open said shutter, stopping said driving step when said cam operable means reaches said moveable member; and starting said driving step again and effecting engagement between said cam operable means and said moveable member and thereby effecting opening of said shutter;

the last said step of starting said driving step again being operable to provide substantially inertia-free engagement between said cam operable means and said moveable member to thereby provide stable shutter opening and enhanced aperture accuracy.

9. A method according to claim 8, wherein said driving step is an operable driving step and comprises driving said cam operable means in one direction, further comprising an actuating driving step driving said cam operable means in an opposite direction for actuating another function of said camera, said actuating driving step preceding said operable driving step.

10. A method according to claim 9, wherein said other function comprises focusing said camera.

11. A method according to claim 9 comprising effecting said driving steps utilizing a reversible motor.

12. In a camera having shutter control means moveable between open and closed positions, the combination comprising cam operable means moveable in a first direction and in a second direction opposite to said first direction, motor means for driving said cam operable means in said first and second directions, and motor control means connected to said motor means for controlling said motor means such that said motor means initially drives said cam operable means in said first direction away from said shutter control means to provide a camera function and to subsequently drive said cam operable means in an opposite direction toward said shutter control means, said motor control means being operable to stop said motor means when said cam operable means is about to encounter said cam operable means and to subsequently restart said motor means to drive said cam operable means as the latter engages said shutter control means and effects shutter opening, said motor control means providing stable shutter opening by substantially reducing the inertial engagement between said cam operable means and said shutter control means.

13. In a camera ccording to claim 12, wherein said camera function is a focus adjustment function and further comprising focus control means for adjusting the focus of said camera to thereby provide said camera function, said motor control means being operable to control said motor means such that the motor means drives said cam operable means in said first direction to effect operation of said focus control means.

14. In a camera according to claim 12, wherein said motor means comprises a reversible motor.

15. In a camera according to claim 13, wherein said cam operable means comprises a rotatably mounted actuating ring member having a cam section thereon, said shutter control means comprising a spring-biased pivotal lever having an engageable part engageable with said cam section, said focus control means comprising a rotatably mounted distance ring member coaxial with said actuating ring member, and cooperable means on said actuating and distances ring members providing for operational rotational control of said distance ring member by said actuating ring member.

* * * * *